United States Patent [19]

Corwin

[11] 4,261,092

[45] Apr. 14, 1981

[54] METHOD OF ELECTROFORMING A METALLIC SLEEVE AND CERAMIC SHAFT JOINT

[75] Inventor: John M. Corwin, Royal Oak, Mich.

[73] Assignee: Chrysler Corporation, Highland Park, Mich.

[21] Appl. No.: 77,514

[22] Filed: Sep. 20, 1979

[51] Int. Cl.³ .................. B23P 17/00; B23K 20/06
[52] U.S. Cl. ........................... 29/421 M; 228/107
[58] Field of Search ........... 228/107, 108, 109, 265, 228/243; 29/421 M, 421 E

[56] References Cited

U.S. PATENT DOCUMENTS

| | | | |
|---|---|---|---|
| 2,367,206 | 1/1945 | Davis | 29/421 E |
| 3,214,511 | 10/1965 | Frankin | 29/421 M |
| 3,345,722 | 10/1967 | Brower | 29/421 M |

Primary Examiner—Gil Weidenfeld
Assistant Examiner—Kenneth J. Ramsey
Attorney, Agent, or Firm—Newtson & Dundas

[57] ABSTRACT

An improved method of electroforming a metallic member to a ceramic member and joint formed thereby. The method of this invention involves axially pre-loading a ceramic material to be joined to a metal shaft with a force sufficient to place the ceramic component into a state of compression about equal in magnitude to the axially directed tensile stresses expected to be induced in the ceramic material during shrinkage of the metal member about the ceramic.

Further, the compressive pre-load is applied to the ceramic member through materials suitable for absorbing shock waves which might be generated along the longitudinal axis of the ceramic material.

4 Claims, 2 Drawing Figures

U.S. Patent
Apr. 14, 1981
4,261,092
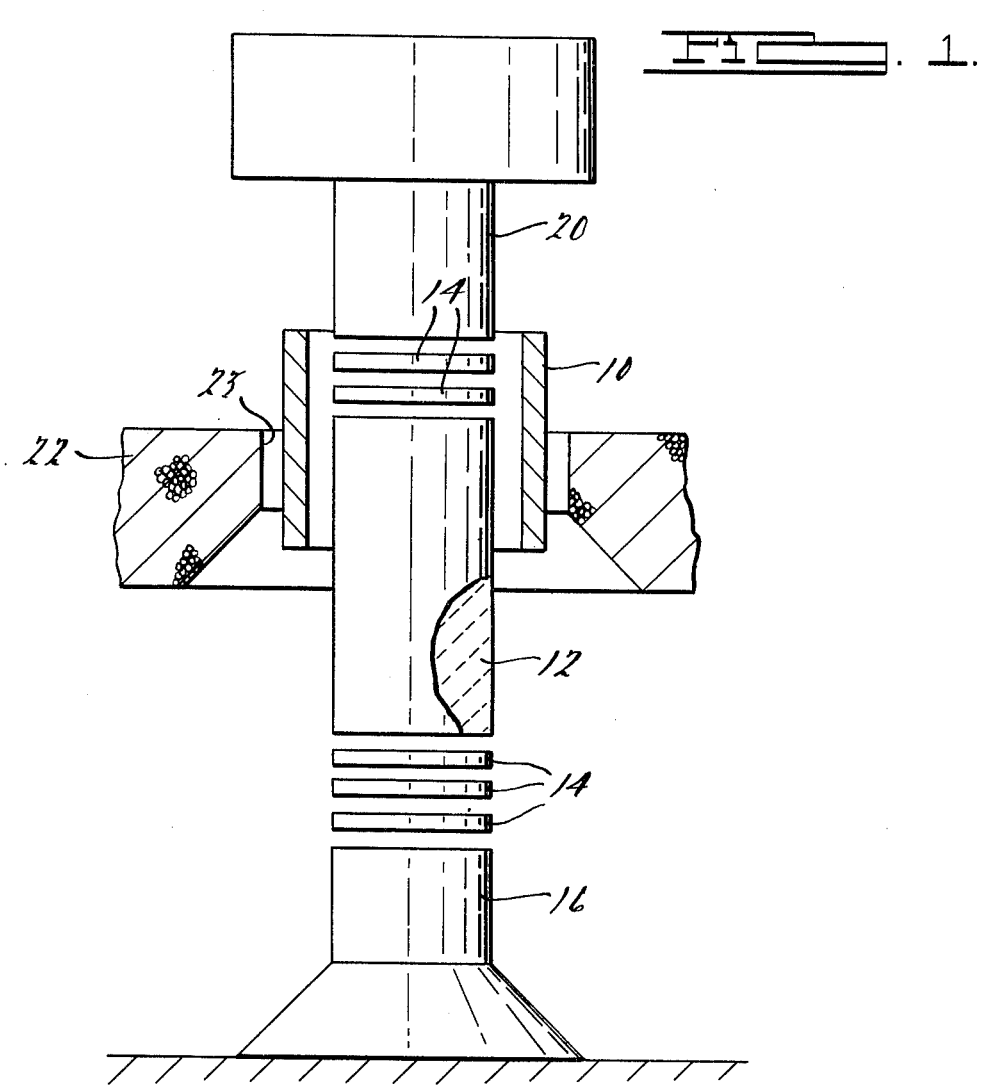
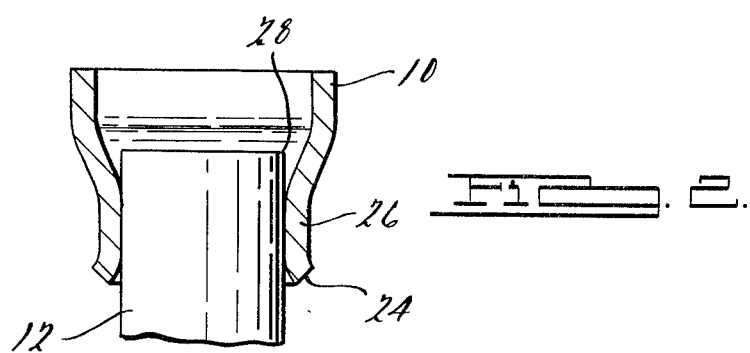

METHOD OF ELECTROFORMING A METALLIC SLEEVE AND CERAMIC SHAFT JOINT

BACKGROUND OF THE INVENTION

1. Field of the Invention

In one aspect this invention relates to electromagnetic forming of metal parts. In a further aspect, this invention relates to electroforming metal parts about a ceramic cylindrical member. In yet a further aspect this invention relates to ceramic and metal parts joined together.

2. Prior Art

In many cases successful applications of ceramic parts to the large scale production runs such as is necessary for automotive and industrial use depend on the use of a cost effective method to join the ceramic part to a metallic part. One example of a metal to ceramic joint which is necessary for utilizing a ceramic part is in a gas turbine or turbocharger structure which requires the attachment of a metallic power shaft to a ceramic rotor. The state of the art can produce a ceramic rotor with a short shaft extending axially from the wheel. However, a metal shaft must be attached to the ceramic portion ot transfer power from the rotor to a drive train.

Coupling the metallic shaft to a ceramic turbine wheel has been at best a difficult and costly task. One method employed in the prior art is a mechanical attachment scheme generally known as a curvic coupling. A curvic coupling is a face spine arrangement with curved radial teeth ground or formed into the face of the parts. In a curvic coupling the coupling memebers can transmit torsional force and are free to absorb relative thermal expansion and axial motion between the two materials. However, such a coupling requires exceedingly close dimensional tolerances and interface contract surface treatment; therefore, the coupling is very costly and difficult to make especially where one member is a ceramic. Such a coupling, while useful as an exercise to prove the concept of a ceramic rotor-metallic shaft assembly, does not meet the requirements of being producible in large volumes and the cost of such structures is prohibitive for use in a large scale consumer product.

Electromagnetic forming is a method which can be used to join a metal to a ceramic. As such, it appears to offer a solution to the problems of the prior art joining methods. Initial attempts to electromagnetically deform a metal shaft about a cylindrical ceramic shaft have shown that the forces generated when the metal shaft is formed rapidly into contact with the ceramic material cause the ceramic to break. Breakage is particularly pronounced where there is a change in the cross-sectional area of the ceramic or areas where the metal has a sharp edge which contacts the ceramic material during forming. Also, it appears that where the metallic sleeve is not uniformly disposed about the periphery of the ceramic material, the metallic sleeve rapidly coming into contact with the ceramic on on one side but not on the other, causes formation of bending stresses on the ceramic. Such stresses frequently cause cracking during the production of the parts.

SUMMARY OF THE INVENTION

The problems of the prior art can be overcome by using the method, fixturing and joint construction of this invention. In practicing the method of this invention, a metallic part to be attached to a ceramic shaft has a sleeve portion disposed about one end of the ceramic shaft. The metal sleeve portion will be axially aligned with the ceramic shaft and surrounds its periphery. At least one damping pad, comprising one or more high damping capacity metallic shock absorbing plates is placed at each end of the longitudinal axis of the ceramic shaft. A compressive preload, corresponding approximately to the expected tensile stresses which will be caused in the ceramic material upon the application of the shock load during forming is applied to the ceramic. Then the electromagnetic forming of the metallic sleeve is carried out in such a manner that the material is firmly engaged with the periphery of the ceramic shaft.

The joint formed in the practice of this invention will have the metallic shaft making contact with the ceramic portion about an annular cylindrical portion slightly removed from the end of the metallic sleeve. At least a portion of the free end of the metallic shaft is raised and spaced from the ceramic shaft.

BRIEF DESCRIPTION OF THE DRAWINGS

In the accompanying drawing:

FIG. 1 is a side view in section showing an apparatus for electromagnetically forming a metal sleeve about a ceramic cylinder using the method of this invention; and FIG. 2 is an enlarged view of the joint between a ceramic shaft and metallic sleeve formed according to the process of this invention.

DETAILED DESCRIPTION OF THE PREFERRED EMBODIMENTS

Referring to the accompanying drawing and initially FIG. 1, the inventive process is described with respect to the application of a cylindrical metal sleeve 10 about a solid ceramic cylinder 12. As shown, the ceramic cylinder 12 has been placed on a plurality of shock wave energy absorbing pads 14 which are in turn rested on a solid bed 16 forming a solid supporting structure. A second plurality of energy absorbing pads are disposed on the axially opposed end of the ceramic cylinder 12 and are contacted by a ram 20. One suitable ram would be a hydraulic ram powered by a hydraulic cylinder (not shown). The ram 20 can be lowered into a position to apply a desired compressive axial preload to the ceramic cylinder without interferring with the operation of the remainder of the apparatus. While a solid ceramic shaft is shown, the ceramic could be tubular also.

The metal sleeve 10 can be formed from suitable metallic materials which are electrically conductive, i.e., molybdenum, titanium, ferrous alloys, nickel alloys, cobalt alloys and the like. The sleeve 10 is disposed about one end of the ceramic cylinder. A toroidal conductive coil 22 surrounds the metal sleeve in close proximity thereto. The metallic coil 22 has electrical leads extending therefrom (not shown) which will be connected to a source of electrical energy such as a capacitor bank. Upon transferring a large quantity of electrical energy from the bank to the electrical coil 20 over a short period, a magnetic field is created, which interacts electromagnetically with the metal sleeve and thereby produces a magnetic pressure on the metal sleeve sufficient to swage or form the sleeve member tightly against the ceramic cylinder 12. This deformation will be essentially in the area of the sleeve which is directly adjacent the coil field shaper 23. The field shaper 23 applies the electromagnetic force to a confined portion of the metal sleeve which lies radially within the field shaper section of the coil 20. The free end portion of the ceramic sleeve which extends beyond the field shaper will not be formed to the same extent and will not be brought into contact with the ceramic cylinder.

As shown in FIG. 2 upon completion of the forming cycle the free end 24 of the sleeve is not in contact with the ceramic shaft and the deformed metal 26 which contacts the ceramic cylinder is somewhat removed from the sharp corner 28 of the ceramic shaft to avoid chipping the ceramic material. Thus, fracture forces which could cause damage to the ceramic are avoided.

A variation on the process of this invention includes heating the portion of the metal sleeve to be deformed around the ceramic portion and deforming the still hot metal. This variation adds the metal shrinkage to the deforming force to create a tighter ceramic-metal bond. Of course, this variation only works with metals which retain their conductivity at higher temperatures.

EXAMPLE

A metal tube to ceramic structure was formed which has a configuration similar to that shown in FIG. 2. An alpha silicon carbide cylinder about 0.928 in. diameter and about one in. long was placed with one end on a damping pad. The pad was fully annealed 95% Zn 5% Ti alloy was one in. in diameter and 0.30 in. thick. The pad rested on a right base member.

An arc cast low carbon molybdenum tube with a one in. diameter, 0.30 in wall thickness and one inch in length was placed about the other end of the silicon carbide cylinder.

An electromagnetic forming field shaper having 1.2 in. inner diameter and a shaping face about 0.25 in. thick was placed about the molybdenum tube. There was about 0.05 in. of free tube beyond the shaping face and about 0.05 in. of silicon carbide cylinder which extended beyond the shaping face.

A second one inch diameter pad was placed on the opposite end of the ceramic cylinder and a ram placed in contact with the pad. An axial preload of 10 KSI was applied to the silicon carbide cylinder.

The field shaper was part of a 10 kilojoule magnaforming machine such as that available from Maxwell Labs and powered by a 16 kilojoule wafer coil.

Upon discharge of the coil, the molybdenum tube was reduced to a tight fit about the silicon carbide cylinder. The reduced area was about 0.25 in. in length and the portion of the tube outside the field shaper was not substantially reduced. The resulting joint had a configuration similar to that shown in FIG. 2 and provided a sound metal to ceramic bond.

Strain gages were attached to the metal sleeve and the amount of strain relaxation measured when the metal sleeve was longitudinally slit. A relaxation strain of 40,000 psi was calculated which shows a substantial amount of clamping force between the metal sleeve and ceramic cylinder.

What is claimed is:

1. A method of joining a metal sleeve to a ceramic shaft comprising the steps of:
    placing at least one shock absorbing metallic pad on each end of the longitudinal axis of said ceramic shaft, said pads being adapted to absorb shock waves propagated in the longitudinal direction in said shaft;
    applying a predetermined axial load to said shaft;
    placing a metal sleeve near one end of said ceramic shaft said metal sleeve having at least a portion which overlaps said ceramic shaft;
    electromagnetically deforming an area of said metallic sleeve in the overlap portion, the deformed area being axially separated from and between the free end of the ceramic shaft and the free end of the metal sleeve.

2. The method of claim 1 wherein said metal pads are a zinc titanium alloy.

3. The method of claim 1 wherein said predetermined axial load is greater than the axial loads caused by the sudden compression of the ceramic material.

4. The method of claim 1 wherein said reduced section is spaced apart from the end of the metal sleeve and also from the end of the ceramic shaft.

* * * * *